United States Patent
Wünning et al.

(10) Patent No.: US 10,578,299 B2
(45) Date of Patent: Mar. 3, 2020

(54) REGENERATIVELY HEATED RADIANT TUBE

(71) Applicant: WS-Wärmeprozesstechnik GmbH, Renningen (DE)

(72) Inventors: Joachim Wünning, Leonberg (DE); Joachim Wünning, Leonberg (DE)

(73) Assignee: WS-Wärmeprozesstechnik GmbH, Renningen (DE)

( * ) Notice: Subject to any disclaimer, the term of this patent is extended or adjusted under 35 U.S.C. 154(b) by 148 days.

(21) Appl. No.: 15/534,653

(22) PCT Filed: Dec. 8, 2015

(86) PCT No.: PCT/EP2015/078976
§ 371 (c)(1),
(2) Date: Jun. 9, 2017

(87) PCT Pub. No.: WO2016/091873
PCT Pub. Date: Jun. 16, 2016

(65) Prior Publication Data
US 2018/0266674 A1    Sep. 20, 2018

(30) Foreign Application Priority Data
Dec. 9, 2014    (EP) ..................... 14196947

(51) Int. Cl.
*F23D 11/44*    (2006.01)
*F23C 3/00*    (2006.01)
(Continued)

(52) U.S. Cl.
CPC .............. *F23C 3/002* (2013.01); *F23L 15/02* (2013.01); *F23L 15/04* (2013.01);
(Continued)

(58) Field of Classification Search
CPC ....................................................... F23C 3/002
See application file for complete search history.

(56) References Cited

U.S. PATENT DOCUMENTS 2,218,281 A * 10/1940 De Ridder .............. F23C 99/00
110/342
5,570,679 A    11/1996 Wunning
(Continued)

FOREIGN PATENT DOCUMENTS

DE        4419332 A1    12/1995
DE       19740788 C1     9/1998
(Continued)

OTHER PUBLICATIONS

International Search Report in corresponding International Application No. PCT/EP2015/078976, dated Jan. 28, 2016, 3 pages.
(Continued)

*Primary Examiner* — Jason Lau
(74) *Attorney, Agent, or Firm* — Fitch, Even, Tabin & Flannery LLP

(57) ABSTRACT

A burner system includes at least one radiant heating tube (22) and a first regenerator (48) disposed at a first end (24) of the tube. A second regenerator (50) is disposed at a second end (26) of the radiant heating tube (22). The first regenerator (48) and the second regenerator (50) are connected to a valve system (54) having first and second operating states for alternately supplying the radiant heating tube (22) with combustion air via one regenerator (48, 50) and for discharging exhaust gases via the other regenerator (48, 50). At least one inner tube (34) is disposed inside and extending along the radiant heating tube (22) at least in sections. The inner tube (34) is connected to a fuel supply line (76) and has outlet openings (46) provided along the longitudinal extension of the inner tube (34).

13 Claims, 3 Drawing Sheets

(51) Int. Cl.
*F23L 15/02* (2006.01)
*F23L 15/04* (2006.01)
(52) U.S. Cl.
CPC ... *F23C 2900/99001* (2013.01); *Y02E 20/342* (2013.01); *Y02E 20/348* (2013.01)

(56) References Cited

U.S. PATENT DOCUMENTS

| | | | |
|---|---|---|---|
| 5,906,485 A | 5/1999 | Groff et al. | |
| 2007/0054227 A1* | 3/2007 | Tada | F23C 3/002 431/181 |
| 2011/0120453 A1* | 5/2011 | Wunning | F23C 3/002 126/91 A |
| 2013/0260323 A1* | 10/2013 | Hong | F23N 5/00 431/6 |

FOREIGN PATENT DOCUMENTS

| | | |
|---|---|---|
| EP | 2184538 A1 | 5/2010 |
| GB | 779669 A | 7/1957 |
| JP | 60-91928 U | 6/1985 |
| JP | S62-242711 A | 10/1987 |
| JP | 05-157212 A | 6/1993 |
| JP | 05-90119 U | 12/1993 |
| JP | H06-241419 A | 8/1994 |
| JP | 07-228917 A | 8/1995 |
| JP | H09-079524 A | 3/1997 |
| JP | H10-318528 A | 12/1998 |
| JP | 2001-165408 A | 6/2001 |
| JP | 2001-165412 A | 6/2001 |
| JP | 2004-077012 A | 3/2004 |
| JP | 2004-279024 A | 10/2004 |
| JP | 2005-188858 A | 7/2005 |
| JP | 2010-112702 A | 5/2010 |

OTHER PUBLICATIONS

European Search Report in corresponding European Application No. EP 14 19 6947, dated May 15, 2015, 6 pages.

Japanese Office Action dated Jul. 2, 2019, in corresponding Japanese Patent Application No. 2017-530640, with English translation (18 pages).

Japanese Notice of Reasons for Refusal dated Nov. 28, 2019, in corresponding Japanese Application No. 2017-530640, with English translation (15 pages).

* cited by examiner

REGENERATIVELY HEATED RADIANT TUBE

CROSS REFERENCE TO RELATED APPLICATIONS

This patent application is the national phase of PCT/EP2015/078976 filed Dec. 8, 2015, which claims the benefit of European Patent Application No. 14196947.7 filed Dec. 9, 2014.

TECHNICAL FIELD

The invention relates to a radiant heating tube having reduced NOx formation and to a method for operating the same.

BACKGROUND

Radiant heating tubes are used to indirectly heat industrial furnaces. In such radiant heating tubes, the fuel utilization efficiency can be increased by preheating the air. So as to preheat the air, burners equipped with heat recuperators or regenerators are used. While, in general, the efficiency is greater in the case of burners equipped with heat regenerators, the apparatus-related complexity for the required switching mechanism is higher.

An industrial burner comprising a radiant tube and a recuperator or regenerators is known from DE 44 19 332 A1, wherein the heating of the radiant tube takes place by way of flameless oxidation. For this purpose, extensive recirculation of the flue gas is maintained in the radiant tube.

Due to preheating of the air, a drastic increase in thermal NOx formation in the flue gas can occur. The solutions proposed in DE 197 40 788 C1, DE 44 19 332 A1 or EP 2 184 538 A1 are primarily based on the method of combustion by flameless oxidation (FLOX®), including very strong recirculation of the combustion flue gases. However, the geometric shape of the radiant tubes must be suitable for this purpose. This is the case, for example, in what are known as P-tubes, double-P tubes or single-ended radiant tubes comprising flame tubes.

Due to installation space constraints in industrial furnaces, however, very thin radiant tubes having a ratio of the radiant tube diameter to the radiant tube length of less than 1:10 are required. The FLOX® combustion process having considerable recirculation for NOx reduction purposes is not a choice that can be considered here.

SUMMARY

It is the object of the invention to provide a concept, in particular for thin radiant tubes, which allows thermal NOx formation to be substantially suppressed.

The burner system according to the invention comprises a radiant heating tube and at least two regenerators. The first regenerator is disposed at the first end of the radiant heating tube, and the second regenerator is disposed at the second end of the radiant heating tube. The first regenerator and the second regenerator are connected to a valve system. In a first operating state of the valve system, combustion air is supplied to the radiant heating tube via the first regenerator. In the first operating state of the valve system, furthermore the flue gas is conducted out of the radiant heating tube via the second regenerator. In the second operating state, the air for combustion is supplied to the radiant heating tube via the second regenerator, while the combustion flue gas is discharged through the first regenerator. In the first operating state, the hot flue gas heats the second regenerator. The first generator, which was previously heated in an operating state, gives off the heat to the air for combustion. After the valve system is switched from the first operating state into the second operating state, the air for combustion is heated by the second regenerator, while the hot flue gas heats the first regenerator. The switching between the first operating state and the second operating state takes place cyclically or in an alternating manner.

An inner tube, which preferably follows the shape of the radiant heating tube, is disposed inside the straight or curved radiant heating tube. The inner tube extends at least through a section of the radiant heating tube. Alternatively the inner tube may extend along the entire length of the radiant heating tube axially through the same. As another alternative, the inner tube extends only along a section of the radiant heating tube. One or more inner tubes can be disposed in the radiant heating tube. The inner tube is preferably not branched. The inner tube is connected to a fuel supply line via which the inner tube is fed fuel. The inner tube forms a gas duct for fuel or a mixture with fuel. The inner tube comprises outlet openings leading into the interior of the radiant heating tube. The outlet openings are distributed along the length of the inner tube.

The fuel, or a mixture with fuel, is transferred through the outlet openings, which are distributed on the inner tube, to the inner chamber of the radiant heating tube in a manner distributed across the length of the inner tube. The outlet openings can be radially oriented, for example. The fuel gas flow, or the mixture flow, preferably exits the outlet openings into the combustion chamber of the radiant heating tube transversely to the flow direction of the combustion air flowing through the radiant heating tube. The gradual or distributed transfer of the fuel results in energy conversion that is distributed over a longer section of the radiant tube. The temperature along the radiant tube is decreased compared to the adiabatic flame temperature. This substantially suppresses thermal NOx formation and steadies the energy transfer of the radiant tube across the length thereof.

In addition, outlet openings are preferably provided on the inner tube along the circumference of the inner tube, whereby energy conversion takes place in a distributed manner not only across the length, but also cross the circumference of the inner tube or of the radiant heating tube.

In particular, the outlet openings are provided on the inner tube in such a way that the radiant tube has a uniform temperature along the burner section of the inner tube. The burner section extends along the section of the inner tube provided with openings.

The center line of the first or second regenerator can coincide with the center line of the other regenerator, or the center lines can extend parallel to and at a distance from one another. The first regenerator and the second regenerator are preferably disposed spaced apart from one another axially or along the air/flue gas flow path through the radiant heating tube.

The first regenerator can be connected to a first air/flue gas line. The second regenerator can be connected to a second air/flue gas line. Preferably, a single air through-flow direction and a single flue gas through-flow direction are defined for the first regenerator, which are oriented in opposite directions. Preferably, only a single air through-flow direction and a single flue gas through-flow direction are also defined for the second regenerator, which are likewise oriented in opposite directions.

The inner tube is preferably fed fuel or a mixture with fuel from one side. For example, the inner tube can be connected to a fuel supply line at a first inner tube end. The second inner tube end can be closed. By the inner tube being fed from only one side, both in the first operating state and in the second operating state, the apparatus-related complexity for switching between the two operating states is low. Due to the one-sided feeding of the inner tube, it is possible for fuel in the inner tube and air/fuel mixture or flue gas in the radiant heating tube to flow in opposite directions in one operating state, and for fuel in the inner tube and fuel/air mixture or flue gas in the radiant heating tube to flow in the same direction in another operating state.

In one embodiment, the flow of the air through the radiant heating tube and the flow of the fuel gas longitudinally through the inner tube can take place in the same direction in one operating state, and in opposite directions in the other operating state. In another embodiment, in a first operating state, a corresponding flow of fuel gas and air in the same direction can be created for one inner tube, and flows in opposite directions can be created for another inner tube. The direction of flow of the air can be exactly reversed in the second operating state, wherein the flow direction of the fuel gas, however, preferably remains the same.

The burner system preferably has the same flow path for the fuel gas up to the outlet openings in both operating states.

The inner tube is preferably connected to a water source or a water vapor source. In particular, the fuel can be mixed with water mist or water vapor so as to suppress carbon black formation inside the inner tube, for example at the beginning of the inner tube at the fuel supply line. The water vapor is preferably generated by way of a heat exchanger, which is fed hot flue gases from the radiant heating tube.

The inner tube can be connected to an air source so that air can be admixed to the fuel. This may also be used to reduce carbon black formation, and thus to avoid deposits, in particular in the inner tube.

The inner tube is preferably connected to a premixing chamber. The premixing chamber is used to produce a mixture of fuel and water vapor or water and/or to produce a mixture with fuel and air. For this purpose, the premixing chamber is connected to a fuel course and the water source or water vapor source and/or the air source. The premixing chamber is preferably disposed upstream of the regenerator disposed on the fuel supply section of the inner tube.

By forming a mixture with fuel and water and/or air, the formation of carbon black can be prevented, wherein the atomic ratio of oxygen to carbon in the mixture, for example in the premixing chamber, is between 0.5 and 1.5, and preferably is smaller than or equal to 1.

The radiant heating tube preferably comprises a recuperator for preheating the fuel or mixture. The recuperator can be coupled to one of the regenerators for the supply of heat. The recuperator is preferably disposed concentrically to one, for example the first, regenerator. The recuperator is preferably coupled either only to the first regenerator or only to the second regenerator. The recuperator preferably has a heat storage capability so as to be able to bridge the time between the end of the heating process by way of flue gas heat and renewed heating.

The radiant heating tube according to the invention can be a longitudinal tube, such as a cylindrical tube. The radiant heating tube can also have a U shape or any other shape, for example. In one embodiment, a preferably straight inner tube can be disposed in each straight leg of the U-shaped radiant heating tube. The radiant heating tube comprising the two inner tubes can thus be produced relatively easily. Fuel can also be supplied from one side here.

The ratio of the length of the radiant heating tube to the diameter thereof is preferably greater than or equal to 10.

At a first end, on which the first regenerator is disposed, the radiant tube is preferably connected to a first air/flue gas line. At a second end, on which the second regenerator is disposed, the radiant heating tube is preferably connected to a second air/flue gas line. One air/flue gas line is used to transport combustion air into the combustion chamber in one operating state, and to discharge flue gas from the combustion chamber in another operating state of the burner system. Preferably, a first flow control device is disposed in the first air/flue gas line. Preferably, a second flow control device is disposed in the second air/flue gas line. A flow control device can comprise a flow metering device, for example, such as an orifice plate.

An industrial furnace according to the invention comprises an above-described burner system, wherein the burner system can comprise one or more, such as at least two, radiant heating tubes. The radiant heating tube are connected in parallel with respect to the supply of fuel or fuel mixture and combustion air. Fuel preferably flows through the radiant heating tubes in the same direction. From one operating state to another, the sense of direction of the through-flow can change by 180°, for example. Preferably, combustion air flows through the radiant heating tubes in the same direction. Fuel preferably flows through the inner tubes of the radiant heating tubes in the same direction. From one operating state to another, the sense of direction of fuel flowing through the inner tubes can remain constant. Fuel is thus preferably supplied from one side of the burner system.

The method according to the invention for operating a burner system comprising a radiant heating tube comprises the step of supplying air to the radiant heating tube, heating the combustion air by way of a first regenerator. Moreover, fuel or a mixture of fuel and air and/or water or water vapor is supplied to the inner tube and transfered into the interior of the radiant heating tube in a distributed manner across the length of the inner tube through openings. The fuel is burned in the radiant heating tube, and the combustion fuel gases are given off from the radiant heating tube through a second regenerator, which is heated in the process. In a further operating state, fuel or a mixture is preferably supplied to the inner tube from the same side as in the first operating state. Only the sides for the supply of air and discharge of the flue gas are reversed, so that, in the second operating state, the air is supplied into the radiant heating tube through the second regenerator, heating the same, while the flue gas is given off from the radiant heating tube through the first regenerator, whereby the same is heated. The method according to the invention for operating the burner system provides for the repeated alternate switching of the system from the first operating state into the second operating state.

Exemplary embodiments of the invention are illustrated in the figures of the drawings. The drawings complement the description. In the drawings:

DETAILED DESCRIPTION

Figure 1:
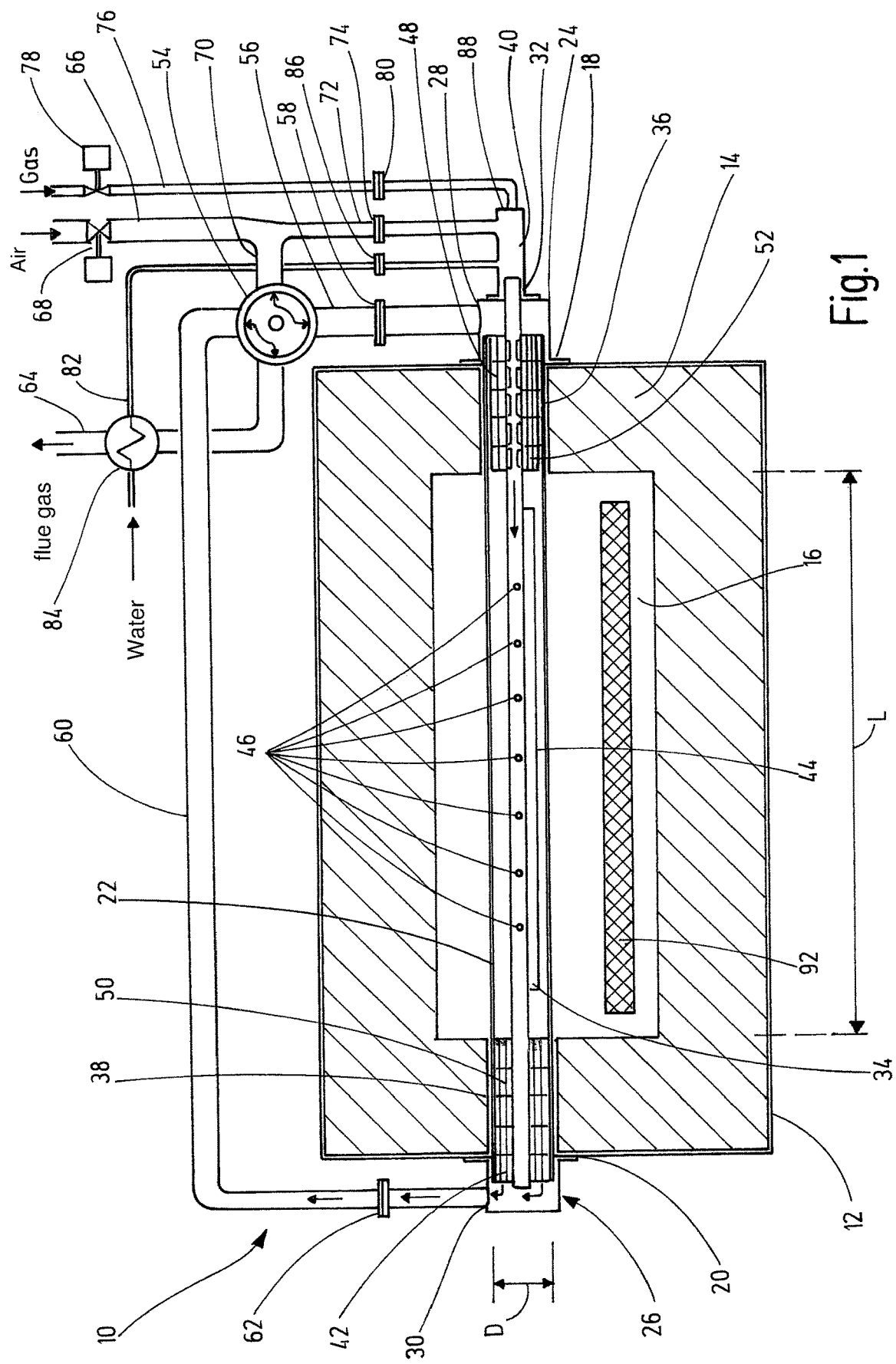
FIG. 1 shows an industrial furnace comprising a burner system according to the invention.

The industrial furnace 10 shown in FIG. 1 comprises a furnace housing 12. The furnace housing 12 comprises an insulating wall 14. The wall 14 surrounds a usable space 16 of the industrial furnace 10. The wall 14 of the furnace housing comprises a first opening 18 and an opposite second opening 20. A radiant heating tube 22 extends through the first opening 18, the usable space 16 and the second opening 20. The radiant heating tube 22 is a cylindrical longitudinal tube. The radiant heating tube 22 comprises a first end 24 at the first opening 18, and a second end 26 at the second opening 20. A first air/flue gas opening 28 is provided at the first end 24 outside the furnace housing 12. A second air/flue gas opening 30 is provided at the second end 26 of the radiant heating tube. A connection opening 32 is provided at the first end 24.

An inner tube 34 extends through the connection opening 32, this opening being filled completely by the inner tube 34. The inner tube 34 can be cylindrical, for example, or at least have a constant diameter along the length of the inner tube 34 or a constant width. The inner tube 34 extends inside the radiant heating tube 22 concentrically thereto through the wall 14 of the furnace housing at the first opening 18 and the second opening 20. The inner tube 34 comprises a first end section 36 at the first end 24 of the radiant heating tube 22. The inner tube 34 comprises a second end section 38 at the second end 26 of the radiant heating tube 22. The inner tube 34 has a fuel connection opening 40 at the first end section 36. The inner tube 34 comprises an inner tube end 42 at the second end section 38 thereof. The inner tube end 42 is preferably closed, but can also have openings. Between the first end section 36 and the second end section 38, the inner tube 34 comprises a burner section 44 having preferably at least three outlet openings 46 provided along the longitudinal extension of the inner tube 34. The outlet openings 46 can be disposed in one or more rows, for example. Outlet openings 46 can also be provided along the circumference of the inner tube 34.

At the first end section 36, the inner tube 34 is surrounded by a first regenerator 48, which extends along the first end section 36. The first regenerator 48 otherwise completely fills the cross-section of the radiant heating tube 22 at the first end section 36 outside the inner tube 34. The first regenerator 48 is preferably disposed in the wall 14 at least in sections. The first regenerator 48 is disposed downstream of the first air/fuel gas opening 28 in the fuel flow direction, so that, in one operating state, air passes through the first air/flue gas opening into the radiant heating tube, and from there through the first regenerator. At the second end section 38, the inner tube 34 is surrounded by a second regenerator 50, which extends along the second end section 38 and otherwise fills the cross-section of the radiant tube 22 outside the inner tube 34. The second regenerator 50 is preferably disposed in the wall 14 at least in sections. The second regenerator 50 is disposed upstream of the second air/flue gas opening 30, so that, in the operating state, the flue gas passes completely through the second regenerator 50 longitudinally, and subsequently exits the radiant heating tube 22 through the second air/flue gas opening 30. A recuperator system 52 is disposed within the inner tube 34 inside the first regenerator 48. The first regenerator 48 surrounds the recuperator system 52 radially and axially. The recuperator system 52 is connected to the first regenerator 48 in a thermally conducting manner. The second regenerator 50 can likewise comprise a recuperator system. In the exemplary embodiment of FIG. 1, however, no recuperator system is assigned to the second regenerator 50.

The burner system comprises a switching valve 54. The switching valve is connected to the first air/flue gas opening 28 of the radiant heating tube 22 via a first air/flue gas line 56. A first air flow metering device 58 is disposed in the first air/flue gas line 56. The switching valve 54 is connected to the second air/flue gas opening 30 of the radiant heating tube 22 via a second air/flue gas line 60. A second air flow metering device 62 is disposed in the second air/flue gas line 60.

The switching valve 54 is connected to a flue gas line 64. An air control valve 68 is disposed in an air line 66. The air line 66 is connected to a first air branch line 70 and a second air branch line 72. The first air branch line 68 is connected to the switching valve 54. A third air flow metering device 74 is disposed in the second air branch line 72.

The burner system furthermore comprises a fuel gas line 76. A gas control valve 78 is disposed in the fuel gas line 76, and a gas flow metering device 80 is disposed downstream of the gas control valve 78.

The burner system furthermore comprises a water line 82. A heat exchanger 84 is thermally connected to the water line 82. The heat exchanger 84 is thermally connected to the flue gas line 64. A water vapor flow metering device 86 is disposed in the water line 82 downstream of the heat exchanger 84. The burner system comprises a premixing chamber 88. The premixing chamber 88 is connected on the outlet side to the fuel connection opening 40 of the inner tube 34. The premixing chamber 88 is connected on the inlet side to the fuel gas line 76, to the second air branch line 72, and to the water line 82.

The burner system for heating the product to be heated 90 provided in the usable space 16 operates as follows in a first operating state.

Flue gas created by the combustion of the fuel gas with the combustion air in the radiant heating tube 22 leaves the radiant heating tube 22 through the second regenerator 50, as indicated by arrows in FIG. 1. As a result, the second regenerator 50 is heated. The flue gas flows through the second air/flue gas line 60 through the switching valve 54, which is in a first switch position, and is discharged from the burner system through the flue gas line 64. In the flue gas line 64, the flue gas gives off residual heat to the heat exchanger 84 so as to thermally feed the same.

Combustion air is provided through the air line 66, wherein the air volume is regulated by way of the air control valve 68. The air flows through the first air branch line 70, and through the switching valve 54 into the first air/flue gas line 56. There, the air volume flowing through the first air/flue gas line 56 can be measured and adjusted by the first air flow metering device 58. The combustion air flows through the first air/flue gas opening 28 into the radiant heating tube 22. Thereafter, the combustion air flows outside the inner tube 34 through the first regenerator 48. The first regenerator 48 has stored heat, which was previously supplied, in one operating state, to the first regenerator 48 by hot flue gas flowing through. The first regenerator 48 gives off the stored heat to the air flowing through the first regenerator 48. Downstream of the first regenerator 48, the heated air enters the section of the radiant heating tube 22 at the burner section 44 of the inner tube 34.

The premixing chamber 88 is fed fuel gas, such as natural gas, via the fuel gas line 76. The gas volume is regulated by way of the gas control valve 78 and measured downstream by way of a gas flow metering device 80.

The premixing chamber 88 can additionally be fed water vapor via the water line 82, the water vapor being generated in the water line 82 using the heat given off by the heat exchanger 84. The water vapor flow can be measured and adjusted by way of the water vapor flow metering device 86.

The premixing chamber 88 can additionally be fed air via the second air branch line 82, wherein the air volume can be measured and adjusted by way of the third air flow metering device 74.

The fuel, or the mixture of fuel and air and/or water vapor, flows from the premixing chamber 88 through the fuel connection opening 40 into the first end section 36 of the inner tube 34. There, the fuel, or the mixture, is preheated by the heat given off by the recuperator system 52. The preheated gas flows into the burner section 44 of the inner tube 34.

In this operating state, combustion air and fuel gas flow through the radiant heating tube 22 in the same direction toward the second end 26. The gas is transferred in increments through the outlet openings 46 along the inner tube 34, along the inner tube 34, to the inner volume of the radiant heating tube 22 outside the inner tube 34 at the burner section 44. In contrast, the portion of combustion air supplied through the first air/flue gas line 56 is always completely available, with the exception of the portion that has already reacted with combustion gas along the inner tube 34 outside the inner tube 34 in the combustion zone.

The excess air present downstream of the first regenerator 48 thus decreases toward the second regenerator 50. The combustion of the volume of gas with the volume of air takes place in stages, so that the heat released by the reacted volume can be given off locally to the radiant heating tube prior to the next stage (at one of the next outlet openings). Due to the local excess of air, the temperature also remains considerably below the adiabatic flame temperature. This substantially suppresses the formation of thermal NOx.

The second operating state is achieved by switching the switching valve into a second switch position. The switching process causes the flow direction in the radiant tube to be reversed. Air, which has already taken part in the combustion process and was situated just upstream of the regenerator 26 previously operated as an outlet, is now pushed back to the other regenerator 24 through the entire length of the radiant heating tube 22. During this switching process, the volume of fuel can be adjusted, such as decreased temporarily.

In the second operating state, the burner system operates as follows, wherein only differences compared to the first operating state will be described, and in particular, the fuel gas follows the same path to the outlet openings as in the first operating state.

The combustion air provided through the air line 66 flows through the first air branch line 70, and through the switching valve 54 into the second air/flue gas line 60. There, the air volume flowing through the second air/flue gas line can be measured and adjusted by way of the second air flow metering device 62. The combustion air flows through the second air/flue gas opening 30 into the radiant heating tube 22. Thereafter, the combustion air flows outside the inner tube 34 through the second regenerator 50. The second regenerator 50 gives off the heat previously taken up from the flue gas, in the first operating state, to the air flowing through the second regenerator 50. Downstream of the second regenerator 50, the heated air enters the section of the radiant heating tube 22 at the burner section 44 of the inner tube 34. In this second operating state, the flows of combustion air and fuel gas takes place in opposite directions since no changes occur in the supply of the fuel gas, or the mixture, into the inner tube 34 compared to the first operating state. The fuel is thus incrementally transferred into the inner volume of the radiant heating tube 22 outside the inner tube 34, having the above-described effects.

For operation, switching between the first operating state and the second operating state takes place continuously by switching of the switching valve 54.

To start up the radiant heating tube 22, this must be brought to the ignition temperature with the aid of an auxiliary burner, which is not shown. It is also possible for an ignition device to be present, which is not shown, with the aid of which the fuel/air mixture in the radiant heating tube outside the inner tube 34 is ignited at the burner section 44.

Figure 2:
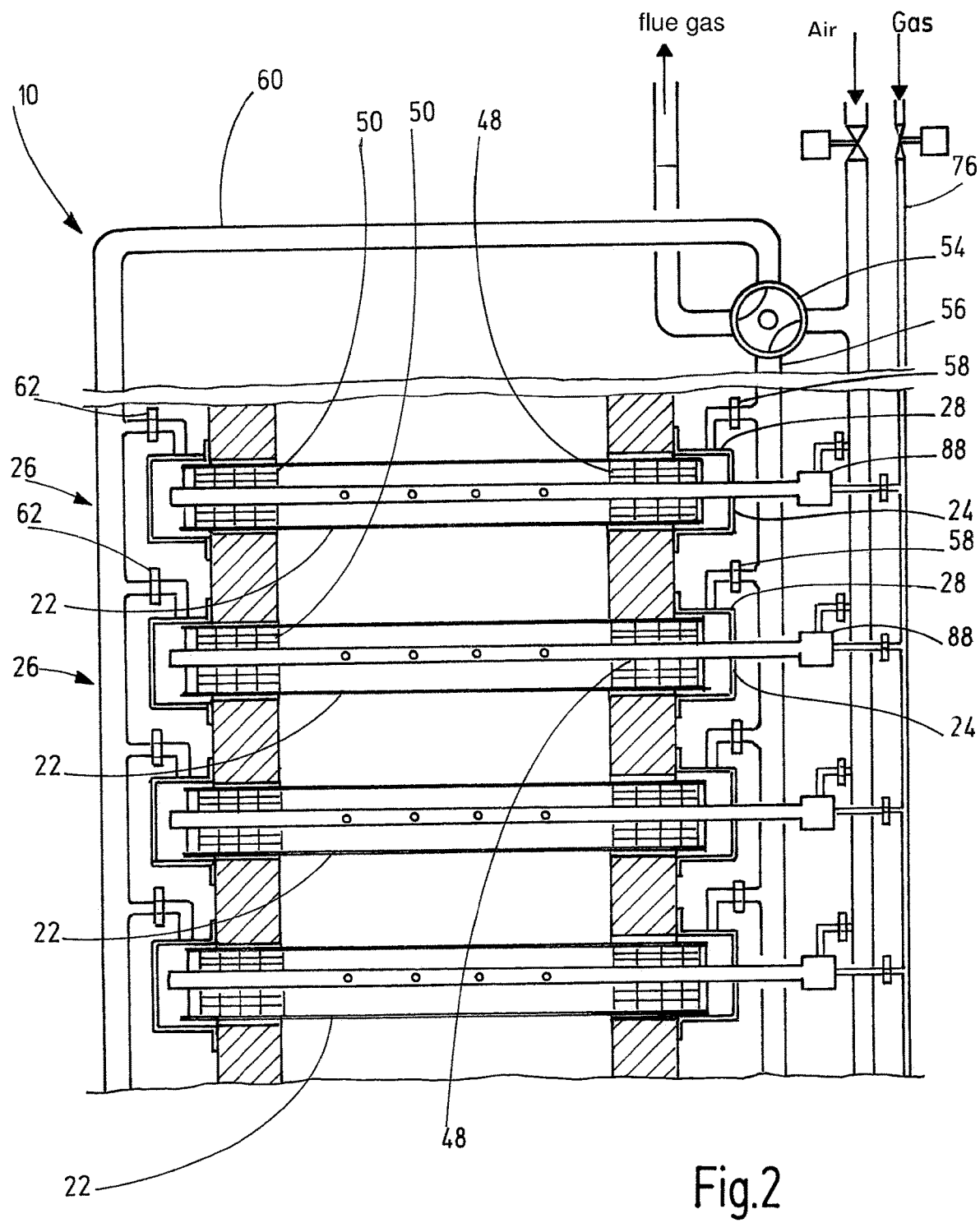
FIG. 2 shows an industrial furnace comprising a burner system according to the invention including multiple radiant tubes.

FIG. 2 shows a section of an industrial furnace 10 comprising a plurality of radiant heating tubes 22 according to the invention, each including an inner tube 34 provided with outlet openings 46.

The configuration comprises a single valve system comprising a switching valve 54 for switching between the first operating state and the second operating state. The first air/flue gas openings 28 are each provided on one side of the industrial furnace. The first air/flue gas openings 28 are connected to the same first air/flue gas line 56. The second air/flue gas openings provided on the opposite second ends 26 are connected to the same second air/flue gas line 60. First air flow metering devices 58 are disposed upstream of the first air/flue gas openings 28 and can be used to individually measure and adjust the air supply into the radiant heating tubes 22 through the first regenerators for each radiant heating tube 22. Second air flow metering devices 62 are disposed upstream of the second air/flue gas openings 30 and can be used to individually measure and adjust the air flows delivered into the radiant tubes 22 through the second regenerators 50 for each radiant heating tube 22. Each radiant heating tube 22 comprises a dedicated premixing chamber 88. All premixing chambers 88 are disposed on the same sides of the radiant heating tubes which face the first ends 24. The premixing chambers are connected to the same second air branch line 72. Third air flow metering devices 74 assigned to the radiant heating tubes can be used to individually measure and adjust the air supplied to the premixing chambers for each radiant heating tube 22.

The premixing chambers 88 of the radiant heating tubes 22 are connected to the same fuel gas line 76. The gas volumes supplied to the premixing chambers 88 can be measured and adjusted for each radiant heating tube by way of gas flow metering devices 80 individually assigned to the radiant heating tubes 22.

As a result of this arrangement, a parallel connection of the radiant heating tubes is achieved. A single air source or fuel gas source is sufficient for supplying the radiant heating tubes. Mutually corresponding devices of the burner system, such as the premixing chambers 88 or the first air/flue gas openings 28, are disposed on the same side of the industrial furnace 10 or the arrangement of radiant heating tubes 22. This simplifies the parallel connection. Overall, the apparatus-related complexity is considerably reduced. In each operating state, the flow through the radiant heating tubes 22 takes place in the same direction. In each operating state, the flow through the inner tubes takes place in the same direction relative to one another and in absolute terms with respect to the burner system. The flows through a radiant heating tube and the associated inner tube alternate between the same direction and opposite directions as a function of the switch between the first and second operating states described in connection with FIG. 1.

Figure 3:
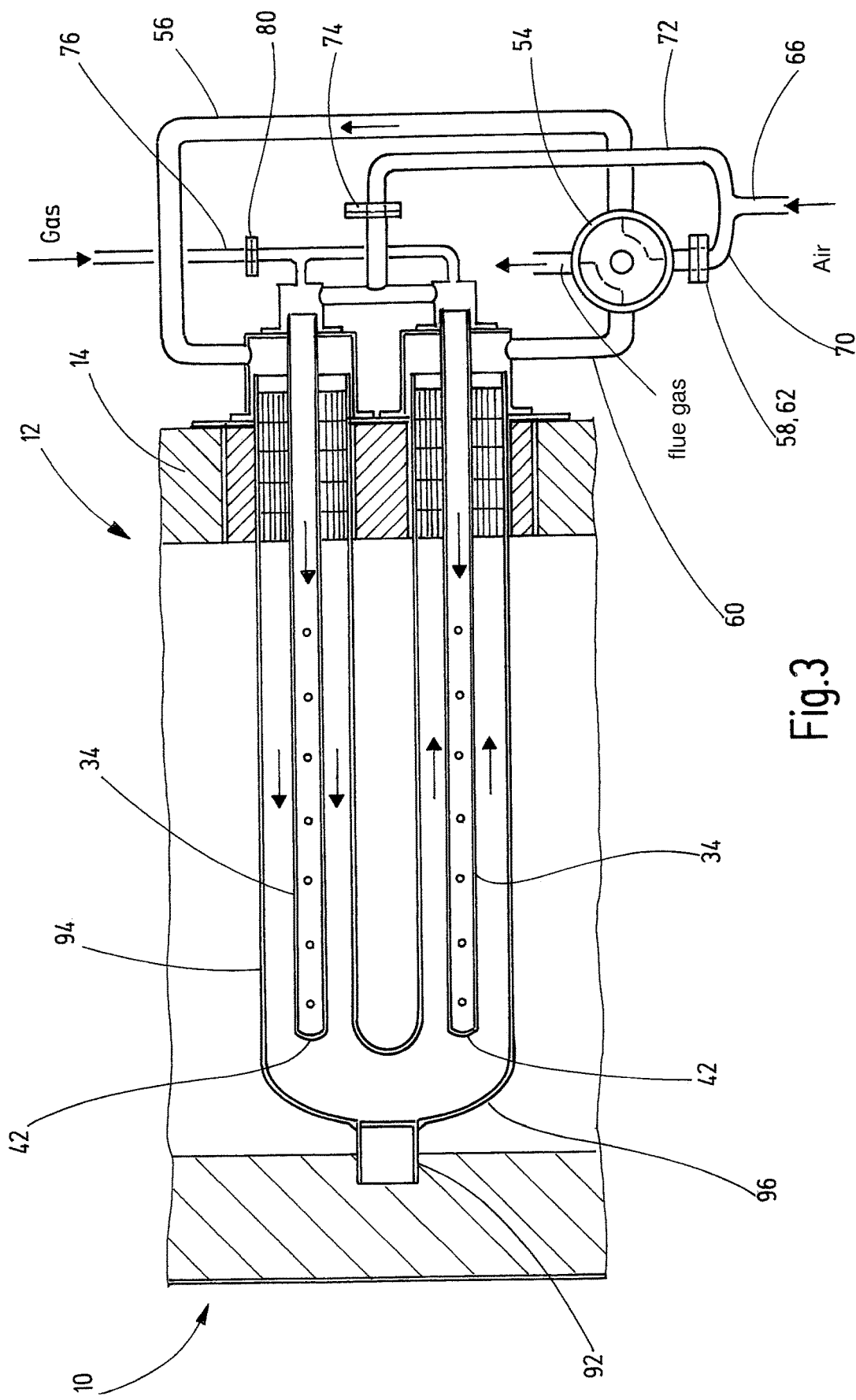
FIG. 3 shows a burner system comprising a U-shaped radiant tube.

FIG. 3 shows an industrial furnace 10 comprising a U-shaped radiant heating tube 22 according to the invention. At the first end 24 and the second end 26 of the radiant heating tube, the radiant heating tube is mounted on the same side of the wall 14 of the furnace housing 12. The wall 14 of the furnace housing on the opposite side comprises a mount for a bearing connector 92. In this exemplary embodiment, a respective cylindrical inner tube 34 is assigned to each straight leg 94 of the U-shaped radiant heating tube 22. The inner tubes 34 each have closed inner tube ends 42, which face the curved section 96 of the U-shaped radiant heating tube 22. The first regenerator 48 and the second regenerator 50 are each disposed at the ends of the radiant heating tube 22. The first regenerator 48 and/or the second regenerator 50 can comprise a recuperator system and thermally feed the same, corresponding to the arrangement of FIG. 1. The supply of the radiant heating tube with combustion air flowing through the first regenerator 48 and the second regenerator 50 outside the inner tube 34 through the radiant heating tube essentially takes place as in the case of the radiant heating tube of FIG. 1. In this case, a first air flow metering device 58 is disposed upstream of the switching valve 54 in the first air branch line 70, the switching valve being used to measure and adjust the combustion air volume transferred into the radiant heating tube 22.

The supply of the inner tubes 34 with fuel gas or a fuel gas/air mixture takes place simultaneously. The two inner tubes 34 are preferably not supplied alternately with fuel gas, but in each operating state the two inner tubes 34 are supplied with fuel gas. For this purpose, the inner tubes 34 each comprise a premixing chamber 88. The premixing chambers are connected to the same second air branch line 72. A third air flow metering device, which can be used to measure and adjust the air volume transferred into the premixing chambers 88, is disposed upstream of the T-cross shaped branch of the second air branch line 72 to the premixing chambers 88. The premixing chambers 88 are additionally supplied simultaneously with fuel gas. For this purpose, these are connected to the same fuel gas line 76. Upstream of the branching point of the fuel gas line 76 to the premixing chambers 88, a gas flow metering device 80 is disposed, which allows the fuel gas volume supplied to the premixing chambers 88 to be measured and/or adjusted. Due to the simultaneous supply of fuel or a mixture of fuel and air to the inner tubes, and the supply of the inner tubes and radiant heating tubes from one side of the furnace wall 14, the apparatus-related complexity for the configuration is considerably reduced. The radiant heating tube can be installed into the industrial furnace 10 from one side. In each operating state, the flows through the inner tubes 34 take place in the same direction with respect to one another, toward the curved section 96. In each operating state, the flows through one inner tube and the radiant heating tube take place in the same direction, and the flows through a second inner tube and the radiant heating tube take place in opposite directions. The direction of flow through one inner tube relative to the direction of flow through the radiant heating tube alternates every time a switch is made between the two operating states.

A concept for a burner system for industrial furnaces 10, in particular comprising thin radiant tubes 20, is provided. The burner system according to the invention comprises at least one radiant heating tube 22. The burner system comprises a first regenerator 48, wherein the first regenerator 48 is disposed at a first end 24. A second regenerator 50 of the burner system is disposed at a second end 26 of the radiant heating tube 22. The first regenerator 48 and the second regenerator 50 are connected to a valve system 54. The valve system 54 has a first operating state and a second operating state for alternately supplying the radiant heating tube 22 with combustion air via one regenerator 48, 50 and for discharging flue gases via the respective other regenerator 48, 50. At least one inner tube 34 is disposed inside the radiant heating tube 22. The inner tube extends along the radiant heating tube 22 at least in sections. The inner tube 34 is connected to a fuel supply line 76. The inner tube 34 has outlet openings 46, which are provided along the longitudinal extension of the inner tube 34 on the inner tube 34 and connect the interior of the inner tube to the volume of the radiant heating tube 22 located outside the inner tube. As a result of the incremental transfer of the fuel, and optionally as a result of the locally prevailing large excess of air, the formation of NOx is substantially suppressed.

List of reference numerals:

| | |
|---|---|
| 10 | industrial furnace |
| 12 | furnace housing |
| 14 | wall |
| 16 | usable space |
| 18 | first opening |
| 20 | second opening |
| 22 | radiant heating tube |
| 24 | first end |
| 26 | second end |
| 28 | first air/flue gas opening |
| 30 | second air/flue gas opening |
| 32 | connection opening |
| 34 | inner tube |
| 36 | first end section |
| 38 | second end section |
| 40 | fuel connection opening |
| 42 | inner tube end |
| 44 | burner section |
| 46 | outlet openings |
| 48 | first regenerator |
| 50 | second regenerator |
| 52 | recuperator system |
| 54 | switching valve |
| 56 | first air/flue gas line |
| 58 | first air flow metering device |
| 60 | second air/flue gas line |
| 62 | second air flow metering device |
| 64 | flue gas line |
| 66 | air line |
| 68 | air control valve |
| 70 | first air branch line |
| 72 | second air branch line |
| 74 | third air flow metering device |
| 76 | fuel gas line |
| 78 | gas control valve |
| 80 | gas flow metering device |
| 82 | water line |
| 84 | heat exchanger |
| 86 | water vapor flow metering device |
| 88 | premixing chamber |
| 90 | product to be heated |
| 92 | bearing connector |
| 94 | straight leg |
| 96 | curved section |
| D | diameter |
| L | length |

The invention claimed is:

1. A burner system, comprising:
a radiant heating tube (22),
a first regenerator (48) and a second regenerator (50), wherein the first regenerator (48) is disposed at a first end (24) of the radiant heating tube (22), and the second regenerator (50) is disposed at a second end (26) of the radiant heating tube (22), the first regenerator (48) and the second regenerator (50) being connected to a valve system (54), the valve system (54) having a first operating state and a second operating state for alternately supplying the radiant heating tube (22) with combustion air via one of the first and second regenerators (48, 50) and for discharging flue gas via an other of the first and second regenerators (48, 50), a recuperator (52) disposed concentrically to one of the first or second regenerators, at least one inner tube (34), which extends along the radiant heating tube (22) at least in sections, disposed inside the radiant heating tube (22), the inner tube (34) connected to a fuel supply line (76), and the inner tube (34) having outlet openings (46), which are provided along at least portions of the inner tube (34) disposed inside the radiant heating tube (22);

wherein the inner tube (34) is connected to a premixing chamber (88) to receive a mixture of fuel and one or both of water vapor and air, wherein the premixing chamber (88) is connected to the fuel source (76) and one or both of one of a water source or water vapor source (82, 84) and an air source (66);

wherein the recuperator (52) is configured to preheat the fuel or fuel mixture.

2. The burner system according to claim 1, wherein a ratio of a diameter (D) of the radiant heating tube (22) to a length (L) thereof is smaller than one to five.

3. The burner system according to claim 1, wherein the outlet openings (46) are provided along a circumference of the inner tube (34).

4. The burner system according to claim 1, wherein the outlet openings (46) are provided on the inner tube (34) in such a way that the radiant heating tube (22) has a uniform temperature along a burner section (44) of the inner tube (34).

5. The burner system according to claim 1, wherein the inner tube (34) is configured to be fed fuel or a mixture with fuel from one side.

6. The burner system according to claim 1, wherein the inner tube (34) is connected to the water source or the water vapor source (82, 84).

7. The burner system according to claim 1, wherein the inner tube (34) is connected to the air source (66).

8. The burner system according to claim 1, wherein an atomic ratio of oxygen to carbon in the mixture is up to one.

9. The burner system according to claim 1, wherein the radiant heating tube (22) is a longitudinal tube.

10. The burner system according to claim 1, wherein the radiant heating tube (22) is a U-shaped radiant heating tube.

11. An industrial furnace (10) comprising a burner system comprising:

at least two radiant heating tubes (22), a first regenerator (48) and a second regenerator (50), wherein the first regenerator (48) is disposed at a first end (24) of one of the at least two radiant heating tubes (22), and the second regenerator (50) is disposed at a second end (26) of the one of the at least two radiant heating tubes (22), the first regenerator (48) and the second regenerator (50) being connected to a valve system (54), the valve system (54) having a first operating state and a second operating state for alternately supplying the one of the at least two radiant heating tubes (22) with combustion air via one of the first and second regenerators (48, 50) and for discharging flue gas via another of the first and second regenerators (48, 50), a recuperator (52) disposed concentrically to one of the first or second regenerators, at least one inner tube (34), which extends along the one of the at least two radiant heating tubes (22) at least in sections, disposed inside the one of the at least two radiant heating tubes (22), the inner tube (34) connected to a fuel supply line (76), and the inner tube (34) having outlet openings (46), which are provided along at least portions of the inner tube (34) disposed inside the radiant heating tube (22), wherein the at least two radiant heating tubes (22) are connected in parallel with respect to the fuel supply line;

wherein the inner tube (34) is connected to a premixing chamber (88) to receive a mixture of fuel and one or both of water vapor and air, wherein the premixing chamber (88) is connected to the fuel source (76) and one or both of one of a water source or water vapor source (82, 84) and an air source (66);

wherein the recuperator (52) is configured to preheat the fuel or fuel mixture.

12. A method for operating a burner system comprising a radiant heating tube (22), a first regenerator (48) and a second regenerator (50), wherein the first regenerator (48) is disposed at a first end (24) of the radiant heating tube (22), and the second regenerator (50) is disposed at a second end (26) of the radiant heating tube (22), the first regenerator (48) and the second regenerator (50) being connected to a valve system (54), the valve system (54) having a first operating state and a second operating state for alternately supplying the radiant heating tube (22) with combustion air via one of the first and second regenerators (48, 50) and for discharging flue gas via another of the first and second regenerators (48, 50), a recuperator (52) disposed concentrically to one of the first or second regenerators, at least one inner tube (34), which extends along the radiant heating tube (22) at least in sections, disposed inside the radiant heating tube (22), the inner tube (34) connected to a fuel supply line (76), and the inner tube (34) having outlet openings (46), which are provided along at least portions of the inner tube (34) disposed inside the radiant heating tube (22), wherein the inner tube (34) is connected to a premixing chamber (88) to receive a mixture of fuel and one or both of water vapor and air, wherein the premixing chamber (88) is connected to the fuel source (76) and one or both of one of a water source or water vapor source (82, 84) and an air source (66); the method comprising:

preheating the fuel or fuel mixture by the recuperator (52);

supplying the fuel mixture into the inner tube (34) and incrementally transferring the fuel or the fuel mixture into the radiant heating tube (22) in a distributed manner across the length of the inner tube (34) via the outlet openings (46) in the inner tube (34), in the first operating state and in the second operating state;

supplying air into the radiant heating tube (22), heating the air by way of the first regenerator (48), and discharging flue gas from the radiant heating tube (22) through the second regenerator (50), heating the second regenerator, in the first operating state; and supplying air into the radiant heating tube (22), heating the air by way of the second regenerator (48), and discharging the flue gas from the radiant heating tube (22) through the first regenerator (50), heating the first regenerator, in the second operating state; and alternately switching between the first operating state and the second operating state.

13. The burner system according to claim 1, wherein the ratio of the diameter (D) of the radiant heating tube (22) to the length (L) thereof is smaller than one to ten.

* * * * *